United States Patent [19]

Kallenberger et al.

[11] Patent Number: 5,377,408
[45] Date of Patent: Jan. 3, 1995

[54] METHOD FOR RETAINING A PIN

[75] Inventors: Harvey J. Kallenberger, Wind Lake; Emeric G. Tossenberger, Nashotah, both of Wis.

[73] Assignee: Harnischfeger Corporation, Brookfield, Wis.

[21] Appl. No.: 130,235

[22] Filed: Oct. 1, 1993

Related U.S. Application Data

[62] Division of Ser. No. 921,846, Jul. 29, 1992, Pat. No. 5,290,119.

[51] Int. Cl.⁶ .................................................. B23P 11/00
[52] U.S. Cl. ..................................... 29/898.07; 29/525.1
[58] Field of Search .................. 29/525.1, 898.07; 37/397; 384/428–431, 435, 438, 439; 403/150, 154, 161, 405.1

[56] References Cited

U.S. PATENT DOCUMENTS

| | | | |
|---|---|---|---|
| 2,208,664 | 7/1940 | Costello | 384/430 |
| 2,398,786 | 4/1946 | Hanks | 29/898.07 X |
| 3,163,474 | 12/1964 | Wilson | 403/119 X |
| 3,225,230 | 12/1965 | Maffey, Jr. | 384/438 X |
| 3,343,016 | 9/1967 | Lewis | 384/438 X |
| 3,554,588 | 1/1971 | Reinsma et al. | 403/154 |
| 3,600,015 | 8/1971 | McMullen | 403/156 |
| 3,808,661 | 5/1974 | Carlsson | 384/439 |
| 4,096,957 | 6/1978 | Iverson et al. | 403/154 X |
| 4,557,529 | 12/1985 | Cherry et al. | 384/439 X |
| 4,629,350 | 12/1986 | Siewart et al. | 403/161 X |
| 4,662,775 | 5/1987 | Faul | 403/298 X |
| 4,750,878 | 6/1988 | Nix et al. | 384/439 X |
| 4,938,731 | 7/1990 | Nguyen et al. | 403/359 X |
| 5,080,501 | 1/1992 | Siebert et al. | 384/439 X |
| 5,192,737 | 7/1992 | Stenner | 384/438 X |

*Primary Examiner*—Mark Rosenbaum
*Assistant Examiner*—S. Thomas Hughes
*Attorney, Agent, or Firm*—Jansson & Shupe, Ltd.

[57] ABSTRACT

The invention is an improvement in a machine having a housing and a pin received in the housing and coupled to a link-like movable part, either directly or with a bushing interposed between the part and the pin the improvement comprises a retainer, preferably of cruciform-shape, which is attached to one end of the and has a plurality of radially-extending retaining arms. The improvement also includes a plurality of arc-shaped abutment members, each of which extends between and is in torque-absorbing contact with a pair of arms. The pin, a wearing component like the movable part or the busing, is intended for eventual replacement when sufficiently worn. The pin is prevented from rotating with respect to the housing which is a non-wearing part expensive to replace or repair. The invention also includes a method for assembling machine components including a housing and a pin so that there is substantially zero clearance between each abutment member and a retainer arm. Relative pin-housing rotational or axial movement prevented without the necessity of resorting to close-tolerance machining at the field erection site.

4 Claims, 9 Drawing Sheets

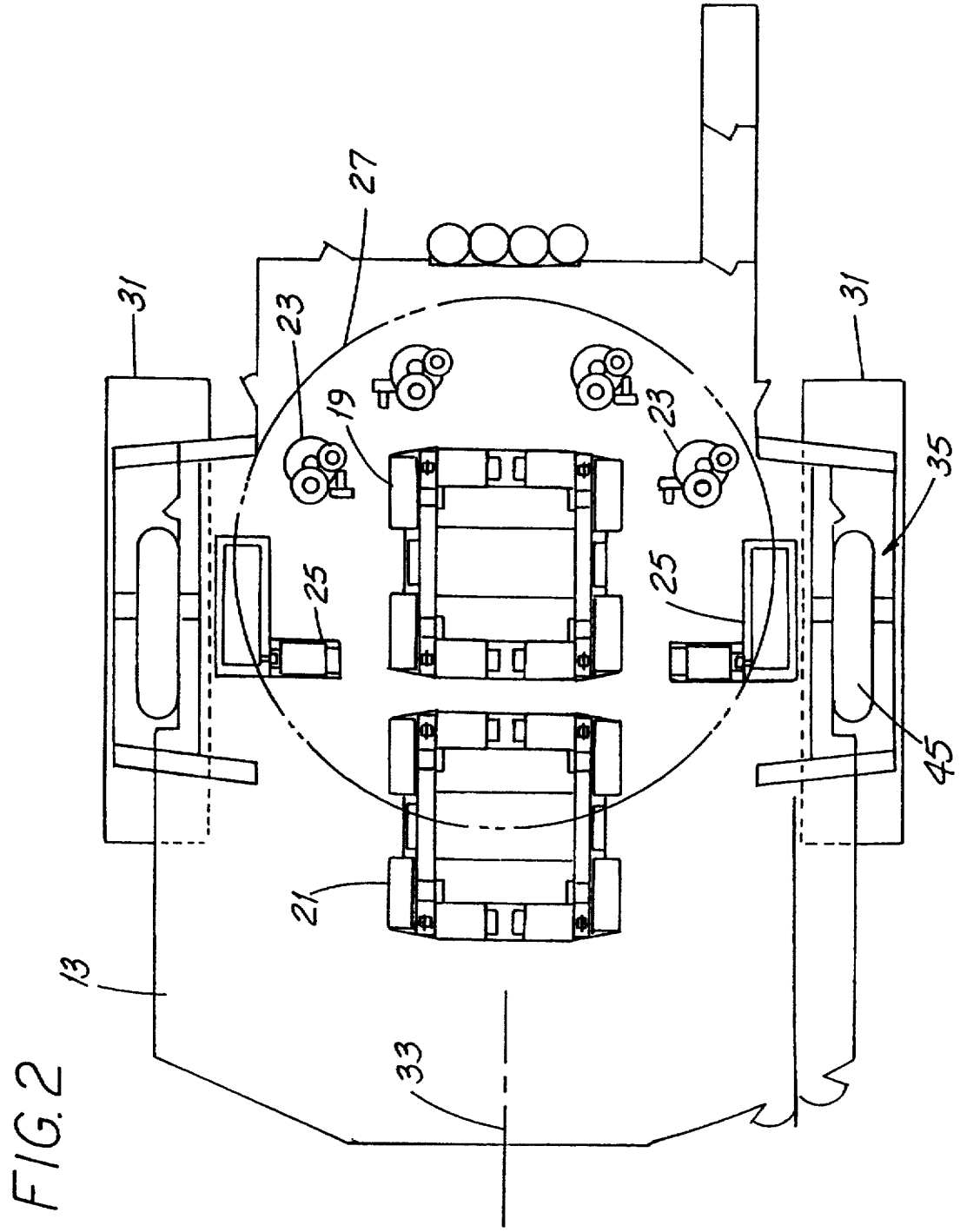

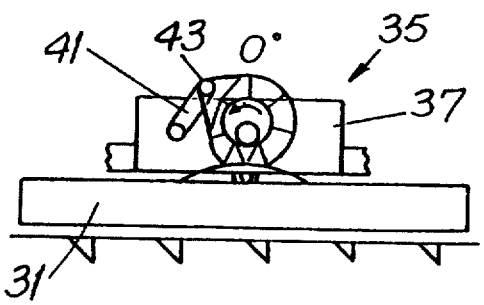# # # # 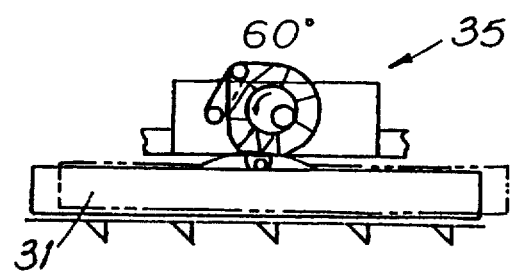
FIG.3A　　　　　FIG.3B
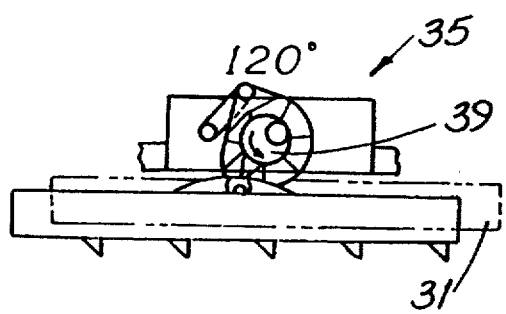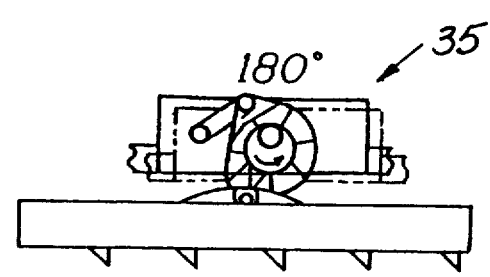
FIG.3C　　　　　FIG.3D
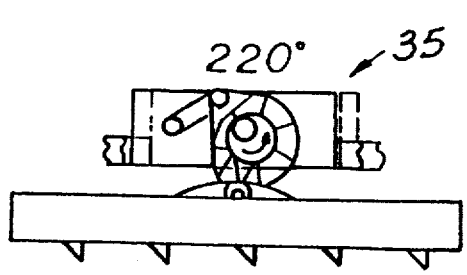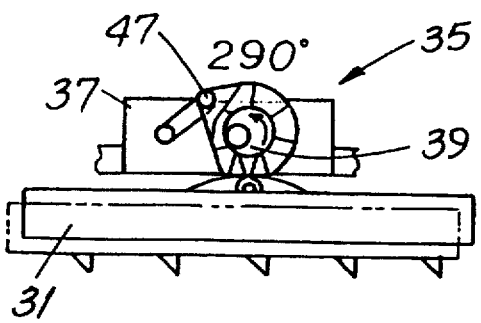
FIG.3E　　　　　FIG.3F
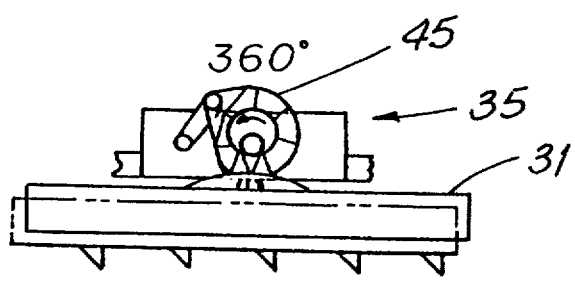
FIG.3G

METHOD FOR RETAINING A PIN

This application is a division of and claims priority from U.S. application Ser. No. 07/921,846, filed on Jul. 29, 1992, titled "APPARATUS AND METHOD FOR RETAINING A PIN" now U.S. Pat. No. 5,290,119, issued on Mar. 1, 1994.

FIELD OF THE INVENTION

This invention relates generally to machine components and, more particularly, to components relatively movable with respect to one another.

BACKGROUND OF THE INVENTION

Pins and pin-like cylindrical parts are frequently used in stationary mounted "in-factory" machines and in mobile machinery to secure certain machine components to one another. One type of application for such pins involves "linking" two components together in a way that one is relatively movable with respect to the other. Rotating crank arms pinned to stationary structures are but one example. A piston-type engine as in most automobiles uses a pin to connect a reciprocating piston head with a connecting rod which not only reciprocates with the head but which also rotates through a degrees with respect to such head.

In what might be termed small scale machines (an auto engine, for example), pin retention is by a cotter key or other type of known retainer. However, with larger machines, pin retention can be and often is substantial design problem. Nowhere is this is more true than in large mobile machines such as earth-moving and earth-excavating machinery.

Such machinery is available in a wide variety of types ranging from the familiar rubber-tire mounted and crawler-mounted to the less-common dragline. A dragline is often used for removing top soil and "overburden" to expose a valuable mineral, e.g., coal, beneath but near the earth's surface.

Draglines are equipped with an angularly-extending boom from which is suspended a "bucket" having an open mouth and digging teeth, both toward the main portion of the machine. Overburden is removed by placing the bucket on the ground at a point distant from the machine and pulling it toward the machine, filling the bucket in the process. Once filled, the machine pivots about a central axis and the bucket emptied at a spoil pile somewhat away from the area being excavated.

Smaller draglines are crawler mounted (much like a military tank) and capable of movement in the same way albiet at much slower speeds. However, as drablines (and their digging buckets) increased in size, crawler mounting was found to be impractical and in the early 1900's, the "walking" dragline was developed. The walking dragline is so named because it takes short "steps" and uses a "walk leg" mechanism (which resembles a human leg) to do so. A difference is that in a walking dragline, both legs step simultaneously.

To give some perspective to the following discussion, a large walking dragline—made by Harnischfeger Industries of Milwaukee, WI., and incorporating the invention—has a main housing portion (including the machinery deck, operator's cab and the like) which is about 105 feet long, about 80 feet wide about 40 feet high and weighs about nine million pounds. The boom extends about 300 feet and the capacity of the digging bucket is about 80 cubic yards. The walk legs of such dragline take steps about seven feet in length.

At least because of its size, weight and complexity, several problems attend draglines of earlier configuration. One is that such machines are usually used in remote sites and replacement parts are difficult to deliver and, because of their size and weight, even more difficult to install. Another is that the machine is shipped in pieces to the site and erected there. While certain types of relatively "loose tolerance" machining equipment are available to facilitate machine assembly (which can take several months), close tolerance machining equipment is not available, at least not readily so.

Wear cannot be avoided in any device having relatively moving parts but the efforts of earlier designers of draglines have not been entirely successful in reducing the effect of wear. For example, some draglines are configured so that wear between parts involved at least one expensive, heavy, hard-to-replace part. And while such parts have been relatively durable and in many cases last for years, repair is accomplished only at great expense for the purchased part and at extended downtime. A machine like a walking dragline represents an enormous capital investment and working "uptime" must be maximized.

Yet another difficulty with earlier draglines that they were sometimes designed and built with "loose" clearances where close or "zero clearance" construction would have been preferred. In the alternative, small clearances were used where indicated and the necessary close-tolerance machining was undertaken in the field at great expense and, on occasion, with questionable results.

As will become apparent, the invention resolves some of these difficulties in unique and imaginative ways.

OBJECTS OF THE INVENTION

It is an object of the invention to provide an improved walking dragline overcoming some of the problems and shortcomings of the prior art.

Another object of the invention is to provide an improved apparatus for handling a machine pin and apparatus and method for retaining the pin in the machine.

Yet another object of the invention is to provide, in a mechanism having a housing and a pin, means for preventing pin rotation with respect to the housing.

Another object of the invention is to provide such a mechanism in which pin movement in axial directions is limited.

Still another object of the invention is to provide a pin retention apparatus permitting certain "zero clearance" assembly while yet avoiding close tolerance machining at the factory or in the field.

Another object of the invention is to provide improved walk leg mechanism for a walking dragline.

Still another object of the invention is to provide an improved method of assembling a dragline walk-like mechanism, shortening dragline assembly time.

How these and other objects are accomplished will become apparent from the following descriptions and the drawing.

SUMMARY OF THE INVENTION

The invention is an improvement in a machine of the type having a housing and a pin received in the housing. The improvement comprises a retainer attached to the pin and including a plurality of radially-extending retaining arms. Attachment is preferably at an exposed first pin end.

Also included is a plurality of abutment members, each of which is in contact with a retaining arm. Because of the member-arm contact, the pin is prevented from rotating with respect to the housing. Such improved arrangement is highly advantageous since the pin, a wearing part like the bushing, is intended for eventual replacement when sufficiently worn. On the other hand, the housing is very heavy, is intended to be a non-wearing part and is expensive and time-consuming to replace.

In a highly preferred embodiment, each abutment member extends between two retaining arms and contracts both retaining arms. Since each abutment member is welded to the housing along substantially the entirety of its length (and therefore provides substantial resistance to shearing forces), the arrangement provides maximum torsional resistance to pin rotation. More specifically, the abutment members are positionally located on the face of the housing during pin insertion and are thereupon welded to the housing. This eliminates any special measuring or handling of the abutment members.

Although prevented from even small incremental rotation with respect to the housing, the pin is capable of limited axial movement with respect to such housing. However, the retainer limits pin movement in a first axial direction, i.e., in a direction away from the retainer. Such movement is limited by the retainer arms bearing against the housing. When a keeper plate is mounted to extend between two abutment members, pin movement in a second axial direction, i.e., a direction toward the keeper plate, is also limited.

And unlike certain other types of pin retainers, the invention is useful with a pin mounted in a blind opening, i.e., an opening of the type preventing access to the second pin end. Irrespective of whether both pin ends are accessible, the improvement also includes structure to redundantly limit pin movement in one or both directions. This "belt and suspenders" approach is especially desirable where the pin is not readily visible to maintenance personnel or where, as in earth-moving machinery, the machine is involved in a virtually continuous, heavy duty, "hard working" application where downtime is enormously expensive.

Accordingly, in another aspect of the invention, the housing includes a bore step redundantly limiting pin movement in the first axial direction. That is, the bore step is redundant as to the retainer which also limits pin movement in such direction.

A keeper plate mounted to extend between two abutment members limits pin movement in a second axial direction or, in the alternative, a retaining collar limits pin movement in such direction. Yet another way to limit pin movement in both axial directions is to attach first and second retainers to the first and second ends, respectively, of the pin. That is, the second retainer is redundant as to the keeper plate or as to the collar.

In another aspect of the invention, the retainer includes at least three retaining arms and to maximize the length of the weld between each abutment member and the housing, the number of abutment members is equal to the number of retaining arms. In a highly preferred embodiment, the retainer includes four retaining arms and is cruciform-shaped.

A method of assembling machine components such as a housing and a pin includes the steps of providing a pin retainer having a plurality of arms and attaching the retainer to the pin, preferable by several bolts inserted through the retainer and threaded to the pin. The pin is then inserted in an opening in the housing. With large pins, the pin-inserting step may also include positioning the pin at least in part by attaching a lifting device to the retainer. Steps also include mounting a plurality of abutment members on the housing so that each abutment member is in contact with at least one arm.

Mounting is by positioning each abutment member to contact an arm and thereupon welding the abutment member to the housing. There is then substantially "zero clearance" between each abutment member and an arm and the pin is prevented from rotating with respect to the housing. And it is to be appreciated that such zero clearance mounting prevents even small increments of rotational movement of the pin in the housing accomplishes that result without resorting to close-tolerance machining in the field.

As briefly mentioned above, a highly preferred method includes the step of mounting a plurality keeper plates, each plate extending between a pair of abutment members. The keeper plates are mounted by bolts and the plates and abutment members are pre-drilled with bolt holes prior to mounting. The importance of pre-drilling and the reason it is possible will become more apparent from the detailed description. However, one point is immediately apparent-drilling need not be done under usually-difficult field conditions.

Merely by way of example, the invention is disclosed in connection with a dragline of the type which is self-propelled over a limited range by a walk-like mechanism often referred to as a "walk leg" because of its resemblance, in shape and motion, to the human leg. The mechanism has a housing and a pin received in the housing and coupled to a "knee link," either directly or by using a bushing (which may or may not be replaceable) interposed between the link and the pin. The knee link may also be replaceable but at greater expense than a bushing.

Very large, heavy machines such as walking draglines are shipped to the field work site in pieces and assembled there. Finish boring and facing equipment is assumed to be available at the site for final boring the hole in the housing through which the pin is inserted and for "facing off" the external portion of the housing adjacent to the hole. However, no equipment is available for close-tolerance machining and fitting of parts.

In an exemplary large dragline, the pin is nearly two feet in diameter, more than two and one-half feet in length and weighs about 2,400 pounds. And in one specific embodiment, the cruciform-shaped retainer weighs about 240 pounds. Clearly, it is very difficult for workers to mount the retainer after pin placement and impossible to manually place the pin into position in the housing. In an aspect of the invention, the retainer is attached to the pin before the pin is inserted and insertion includes positioning the pin at least in part by attaching a lifting device, e.g., a crane sling, to the retainer. In the vernacular, the retainer provides a "handle" for the pin.

Other aspects of the invention are set forth in the following detailed description and the drawing.

BRIEF DESCRIPTION OF THE DRAWING

FIG. 2 is a top plan view, in phantom, of the main housing portion of the dragline of FIG. 1, taken along the viewing plane 2—2 thereof and with parts broken away.

FIGS. 3A-3G show a sequence of operation of one of the walk legs of the dragline of FIG. 1.

DETAILED DESCRIPTION OF PREFERRED EMBODIMENTS

Before describing the preferred embodiments, it should be appreciated (and persons of ordinary skill will appreciate) that the improved apparatus 10 and method are applicable to stationary mounted "in-factory" machines and to mobile machinery to secure certain machine components to one another. The invention has special appeal in applications where pins "link" two components together in a way that one is relatively movable with respect to the other. The invention clearly offers convenience in machines of moderate size and becomes more compelling as the size of the machine increases. To help "dramatize" and emphasize this fact, the invention is disclosed in connection with one of the largest types of machines in the world, a walking dragline 11.

Figure 1:
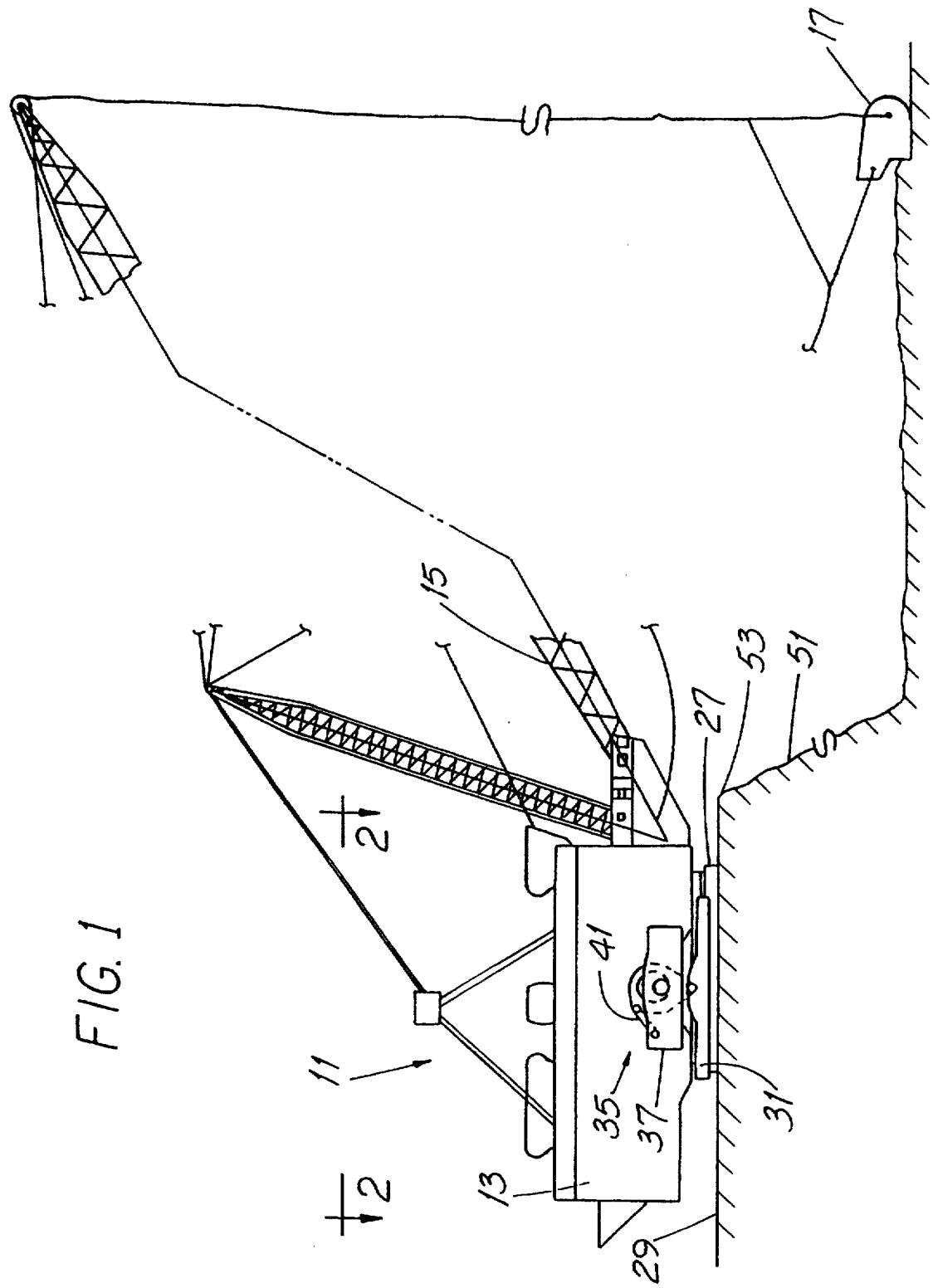
FIG. 1 is a representative side elevation view of a walking dragline.

Referring first to FIGS. 1 and 2, an exemplary walking dragline 11 includes a main housing portion 13 having a boom 15 extending therefrom to support and manipulate a digging bucket 17. Within the housing portion 13 are mounted the bucket hoist, bucket drag and swing systems 19, 21 and 23, respectively. The drive 25 for the "walking" system is also mounted therein. When digging, the dragline 11 sits on and pivots about a generally circular "tub" or platform 27 which rests on the earth's surface 29.

The dragline 11 also includes a pair of pads or "shoes" 31 which, when moved in unison as described below, lift the platform 27 and move the dragline 11 rearward away from the bucket 17. Movement in the exemplary dragline 11 is in "steps" of about seven feet in length and along the long axis 33 of the main housing portion 13.

Figure 4:
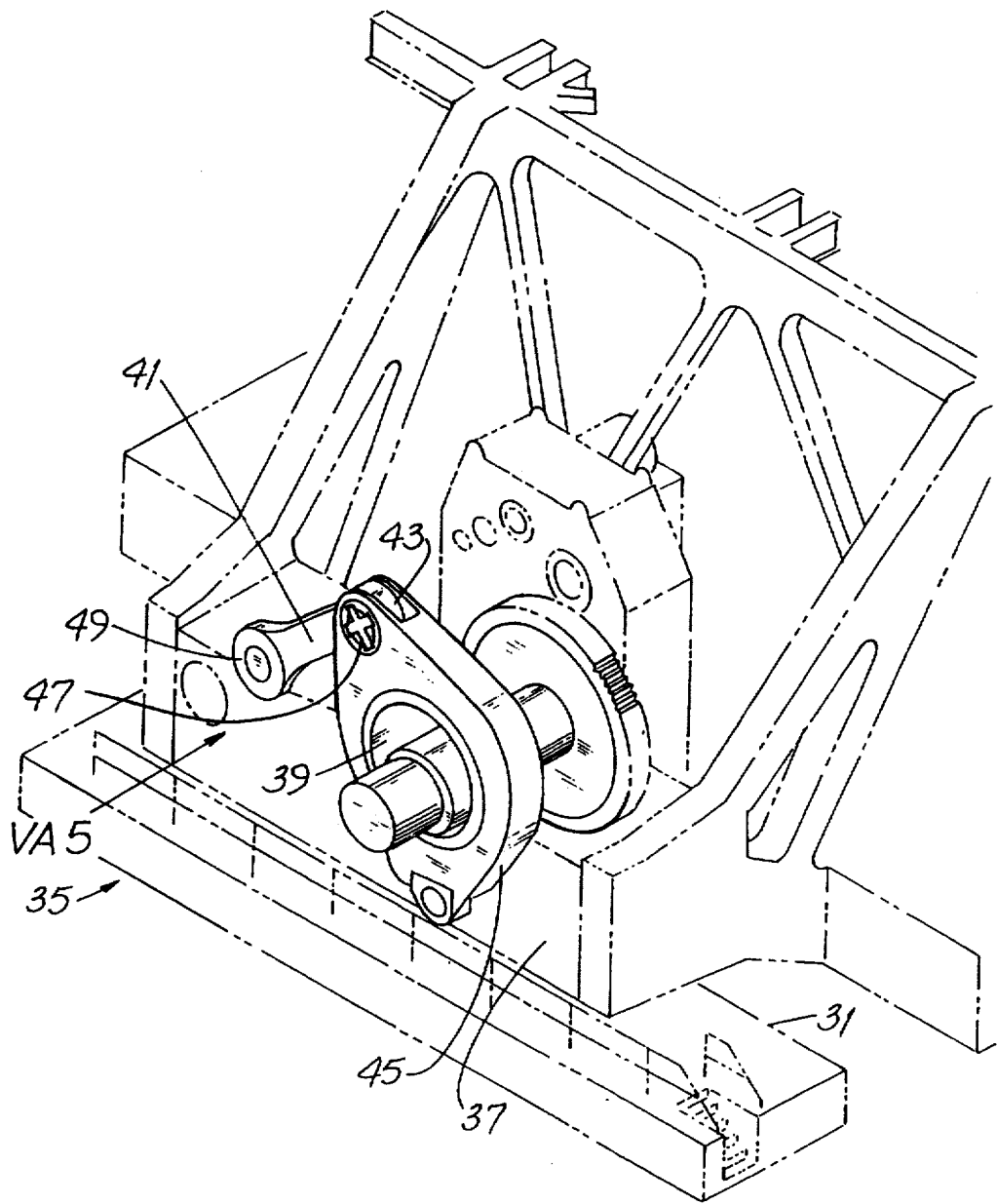
FIG. 4 is an isometric view of the dragline walk leg shown with related supporting structure.

Referring additionally to FIGS. 3A-3G and FIG. 4, a walk-like mechanism 35 typically includes a walk leg structure 37, a driven eccentric 39 and a knee link 41. The knee link 41 has its upper end 43 coupled to the walk leg housing 45 by a pin 47 to permit relative rotation of a few degrees between the link 41 and the housing 45. The lower end 49 of the knee link 41 is similarly coupled to the nearby main housing structure 37. As a rough analogy, the coupling at the upper end 43 of the link 41 is analogous to the human knee and the eccentric 39 is analogous to the human hip joint. While pin 47 is shown to be hollow, it could be a solid pin 47. In FIG. 4, numeral 39 indicates the location of the eccentric shown in FIGS. 3C and 3F.

As the eccentric 39 is driven counterclockwise (in FIG. 4 and in the right-side sequence of FIGS. 3A-3G) through one revolution, the shoe 31 is lowered to ground contact and the dragline 11 lifted and moved rearward The shoe 31 is then raised until the platform 27 again rests on the surface 29.

Since the bucket 17 is drawn toward the dragline 11, removal of overburden 51 progresses toward the dragline 11 until the edge 53 of the pit becomes relatively near to the dragline 11. Therefore, the dragline 11 must occasionally be moved rearward a few feet to expose additional overburden 51 for digging.

Detailed aspects of the inventive apparatus 10 will now be described with reference to FIG. 5 and, particularly, to FIG. 6. The housing 45 includes outer and inner walls 55 and 57, respectively, each having a flat, annular face 59. Each face 59 is concentric with the long axis 61 of the pin 47, defines a plane normal to the pin 47 and also has an edge 63 which defines an opening 65 in the housing wall 55 and 57, respectively. The pin 47 connects the upper end 43 of the knee link 41 with the housing 45 and in a highly preferred, more-readily-repairable arrangement, includes a bushing 67 press-fitted into the end 43 and interposed between the end 43 and the pin 47. The knee link 41 (if devoid of a bushing) and the pin 47 are both considered expendable parts, the bushing 67 may be expendable and all three parts are replaced rather readily (but at varying cost) when sufficiently worn.

Figure 6:
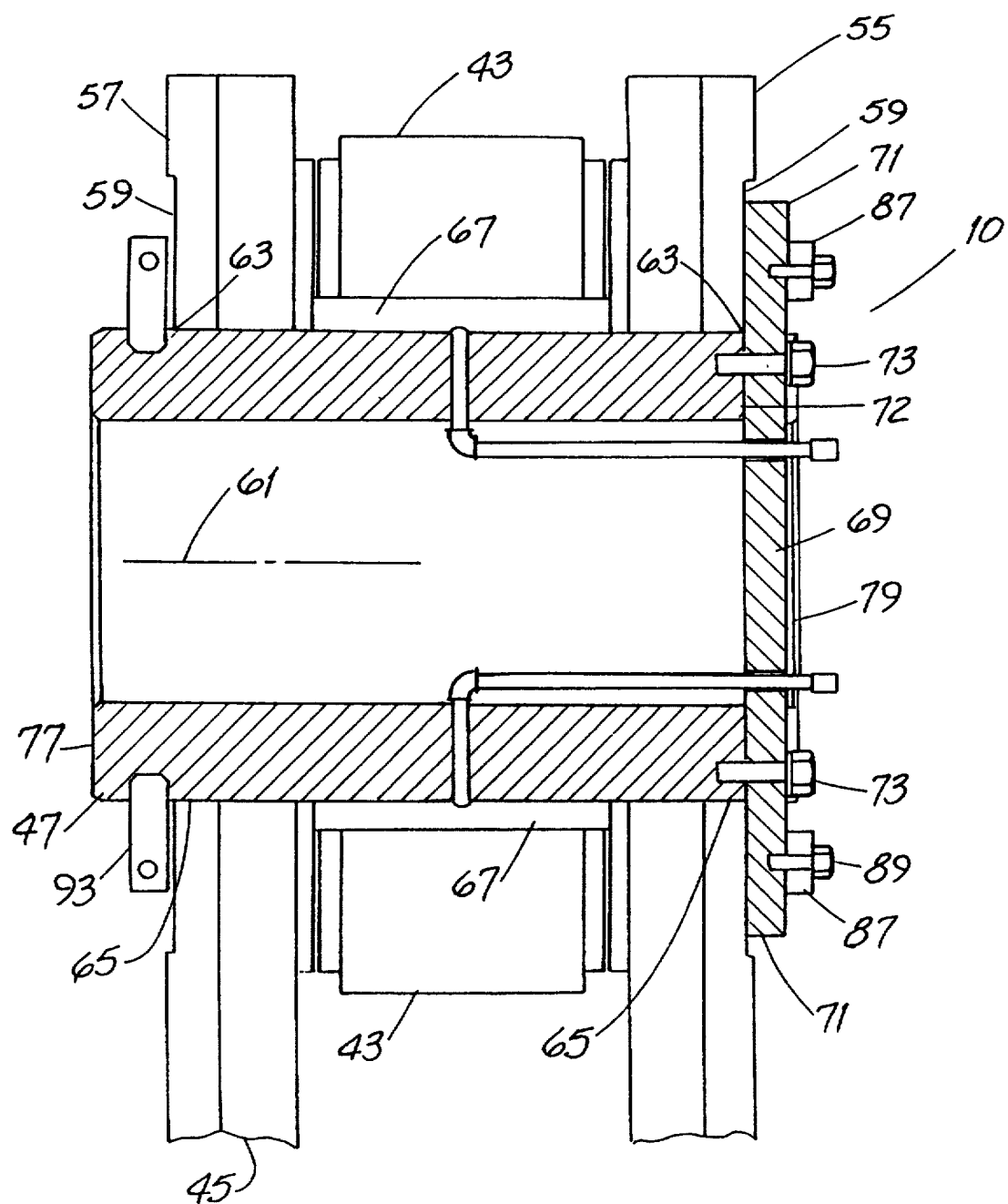
FIG. 6 is an elevation view, partly in cross-section, of the structure of FIG. 5. Abutment members are omitted for clarity.

As is apparent from FIG. 6 and as the knee link 41 "swings" relative motion can and does occur between the bushing 67 and the pin 47. Unless prevented, relative motion could also occur between the pin 47 and the housing 45. Such motion prevention is important since, unlike the pin 47, bushing 67 and, possibly, the knee link 41, the housing 45 is a very heavy, expensive component which is difficult to replace in the field.

Figure 5:
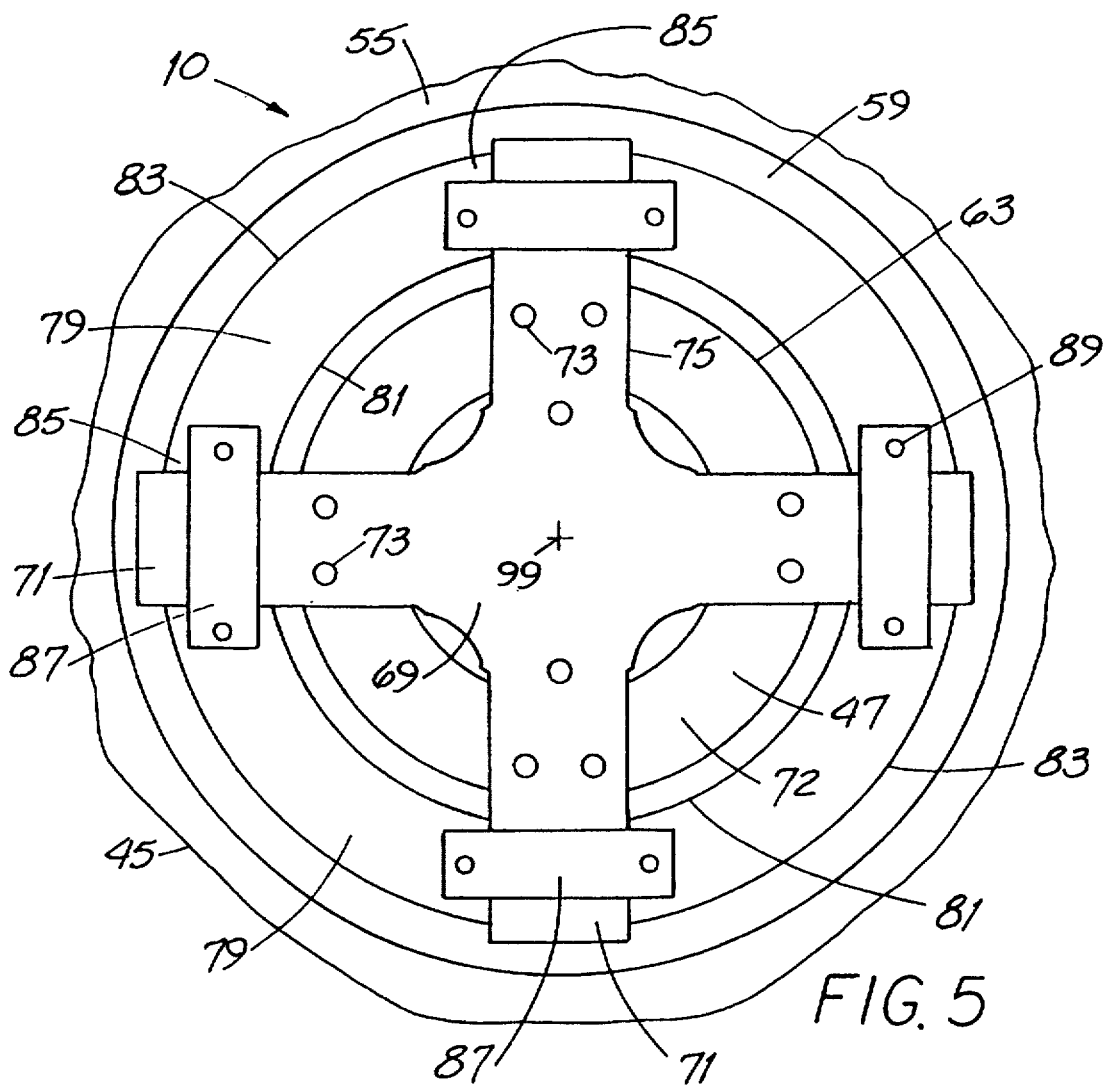
FIG. 5 is an elevation view of a portion of the walk leg housing (part of which is broken away) and the pin and retainer taken along the viewing axis VA5 of FIG. 4.
Figure 8B:
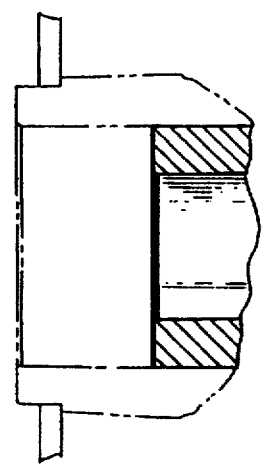
FIG. 8B is an elevation view generally like that of FIG. 8A except that the pin is in an opening of uniform diameter.

Referring particularly to FIG. 5, a retainer 69 has a plurality of arms 71 extending radially outward. Preferably, each arm 71 is of generally uniform width along its length, the arms are of generally uniform width one to the other and the retainer 69 is of uniform thickness.

The retainer 69 is attached to the outer end 72 of the pin 47 by a plurality of bolts 73 extending through each retainer arm 71 and threaded into appropriate holes in the pin end 72. In a highly preferred arrangement, slots 75 are milled in the first end 72 of the pin 47 to receive the retainer 69. In that way, the bolts 73 are isolated from shear forces. The retainer 69, weighing about 220 pounds in a specific embodiment, is very sturdy and limits pin movement in the first or inward axial direction, i.e., to the left in FIG. 6.

Figure 8A:
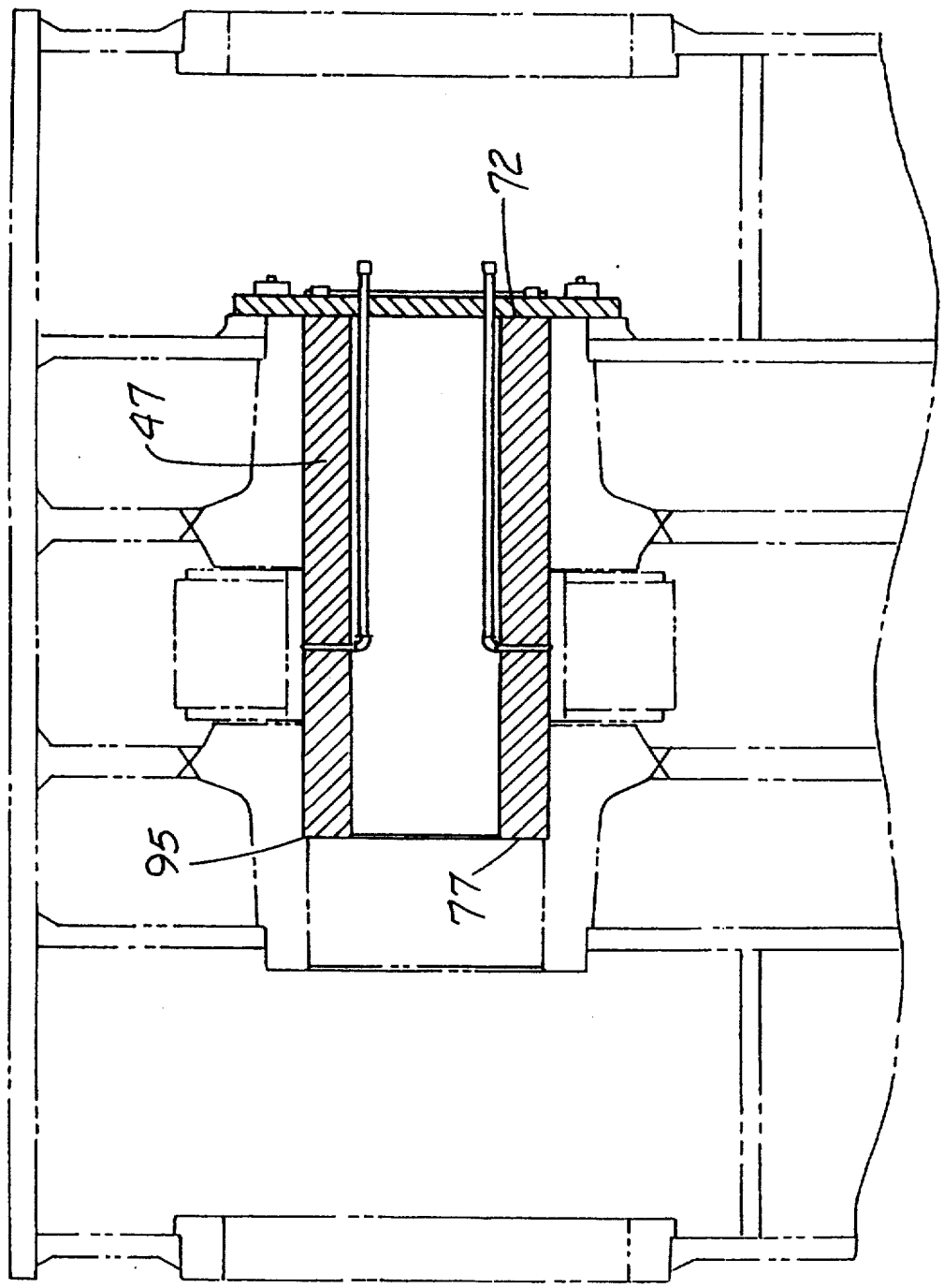
FIG. 8A is an elevation view, partly in cross-section, of a structure similar to that of FIG. 6 but involving a pin in a "blind" opening having a bore step limiting pin axial movement.

The pin 47 and openings 65 in the housing walls 55, 7 are cooperatively sized so that the pin 47 is received in the housing 45 with very slight clearance. Because of its weight as described in the exemplary dragline 11, it is highly advantageous to attach the retainer 69 to the pin prior to inserting the pin 47 in the openings 65. This is particularly true where the pin 47 is to be inserted into an opening 65 having a stepped bore as shown in FIG. 8A where external lifting devices are not readily adaptable. The inventive arrangement readily permits such "pre-attachment." Another advantage of this arrangement is that the retainer 69 can be used (with appropriate lifting equipment) to help lift the pin 47 and facilitate pin insertion.

Depending upon the specific machine configuration, the first pin end 72 or both the first and second pin ends 72, 77 may be exposed for attachment of retainers 69 or retaining devices. Later in the specification, there is explanation of ways to provide redundant pin retention in "through" or "blind" openings.

After the pin 47 is inserted through the openings 65, abutment members 79 are placed against each face 59 and positioned so that each end of each abutment member 79 is in contact with a retainer arm 71. Once positioned, each abutment member 79 is welded to the face 59 along the inner and outer member edges 81 and 83, respectively. It will be observed that each abutment member 79 is relatively long and, referred to the pin axis 61, spans an arc of about 80° or so in the preferred embodiment. However, intersecting lines extending from the ends 85 of each member 79 defines an angle of 90°. Since welding is preferably along both edges 81, 83 there is substantial strength and resistance to the torsional loads that may be applied to the abutment members 79 by the pin 47 through the arms 71.

It should be appreciated that instead of using milled slots 75, the retainer 69 can be doweled to the pin 47 to absorb shear forces. Similarly, the abutment members 79 can be doweled and/or bolted to the face 59 rather than being welded thereto. But these are more complex approaches than that described above.

Without the abutment members 79, it is apparent from FIG. 5 that the pin 47 would have a tendency to undesirably rotate incrementally in the housing 45. And it is to be appreciated that each abutment member 79 is brought to and secured in a "zero clearance" position with respect to the arms 71 with which it is in contact. Essentially no rotational movement of the pin 47 occurs and such result is achieved without close tolerance machining, either at the factory or in the field.

Figure 7:
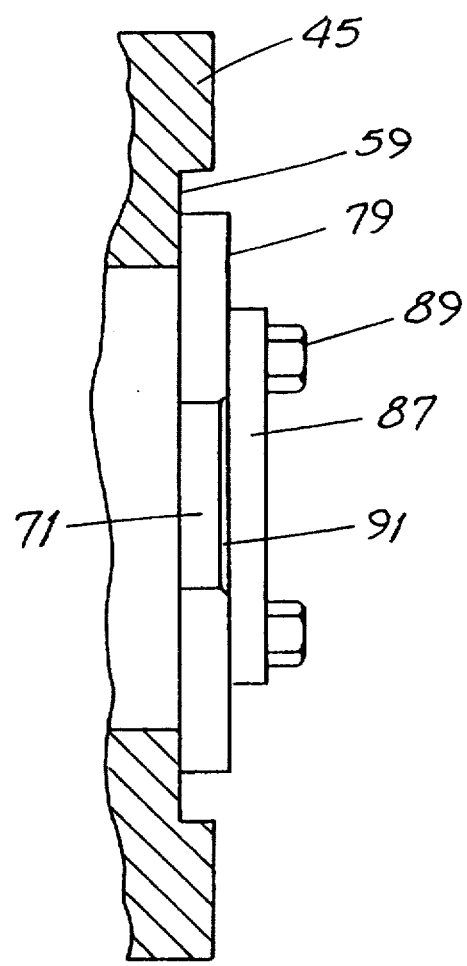
FIG. 7 is an elevation view, partly in cross-section, of a portion of the structure of FIG. 6.

For reasons explained below and as shown in FIG. 7, the abutment members 79 are selected to have a thickness slightly greater than the thickness of the retainer 69 and arms 71. A relatively light weight keeper plate 87 spans each pair of abutment members 79 and is secured by bolts 89 threaded into the abutment members 79. Because of the disparity in thickness between the members 79 and the arms 71, a slight clearance 91 is provided between the keeper plate 87 and the arm 71.

For the reasons mentioned above, it may be important to provide redundant retention of pins 47 to prevent excessive axial movement. And such retention should be available for either "through" openings (where both ends 72, 77 of the pin 47 are accessible) or "blind" openings where only one end 72 is accessible.

Referring again to FIG. 6, the housing has a through opening 65 and pin movement in the second axial direction (to the right in the FIGURE) is limited by a Split retaining collar 93 as well as by the keeper plates 87. It should be appreciated that a second retainer 69 or another type of retaining device could be attached to the pin second end 77 to provide redundancy.

Referring additionally to FIG. 8A, the housing 45 has a blind opening which includes a bore "step" or shoulder 95 limiting movement of the pin 47 in the first or leftward axial direction. Such shoulder 95 is redundant as to the retainer 69 which likewise limits such movement.

Figure 9:
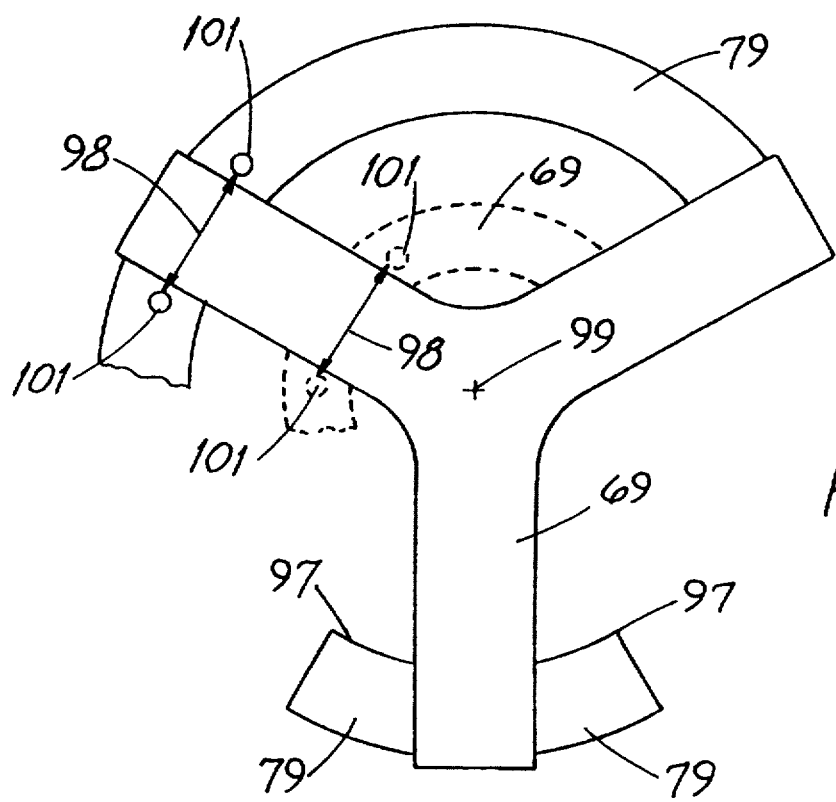
FIG. 9 is an elevation view of another embodiment of the retainer and abutment member.
Figure 10:
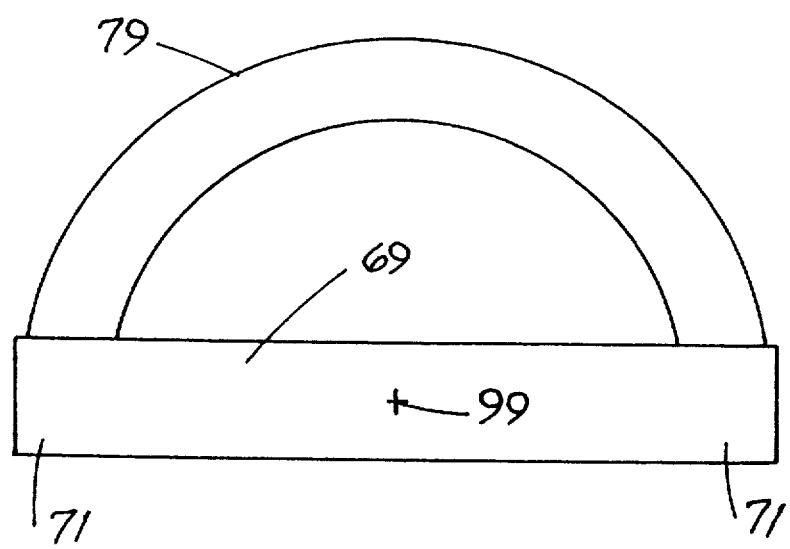
FIG. 10 is an elevation view of yet another embodiment of the retainer and other embodiments of the abutment member.

As shown in FIG. 5, a highly preferred retainer 69 is cruciform is shape and has four retaining arms extending radially outward and spaced about 90° apart. And other variations are possible. For example, FIG. 9 shows a retainer 69 having three retaining arms 71 spaced about 120° apart while FIG. 10 shows a bar-like retainer 69 having two arms 71 spaced about 180° apart. In each instance, each corresponding abutment member 79 has a length selected to span the distance between two adjacent arms 71. And in all embodiments, the number of one-piece abutment members 79 is equal to the number of arms 71.

After appreciating the foregoing, one of ordinary skill will understand that as shown in FIG. 9, short arc-shaped blocks could be used as abutment members 79. However, the preferred embodiments are selected to optimize resistance to torsional loading and simplicity of assembly, the latter by minimizing the number of pieces.

But that is not all. There is another, highly advantageous aspect to the inventive apparatus 10. Referring again to FIGS. 6 and 9, it will be recalled that each retainer arm 71 is of generally uniform width along its length and that the arms 71 are of generally uniform width one to the other. The spacing 98 between each pair of bolts 89 holding a keeper plate 87 and between each pair of abutment member holes 101 in which the bolts 89 are received is a function of arm width but, importantly, not of the relative position of the abutment members 79 with respect to the arm center 99. And the foregoing is true even if the arms 71 are tapered somewhat on each side rather than being of uniform width.

Using the three-legged retainer 69 of FIG. 9 as an example, an abutment member 79 can be at a position shown in solid outline or a shorter member 79 at a position shown in dashed outline (or anywhere in between) and the bolt hole spacing 98 does not change. The functional result is that all bolt holes 101 can be drilled and, where necessary, tapped at the factory prior to shipment. No close tolerance drilling need be done in the field and this fact is of substantial importance with larger, field erected machines.

While the invention has been shown and described in connection with a few preferred embodiments and in connection with a specific machine, a walking dragline 11, it should be clearly understood that such embodiments are exemplary and not intended to be limiting.

We claim:

1. A method of assembling machine components including a housing and a pin, the method including the steps of:
   providing a pin retainer having a plurality of arms;
   attaching the retainer to the pin;
   inserting the pin in an opening in the housing; and,
   mounting a plurality of abutment members on the housing, each abutment member being in contact with at least one arm,
whereby there is substantially zero clearance between each abutment member and an arm and the pin is prevented from rotating with respect to the housing.

2. The method of claim 1 further including the step of mounting a plurality of keeper plates on the abutment members, each plate extending between and connected to a pair of said plurality of abutment members, thereby limiting pin movement in a second axial direction.

3. The method of claim 2 wherein the step of mounting the keeper plates comprises pre-drilling bolt holes in the keeper plates and mounting the keeper plates by means of bolts mounted in the bolt holes.

4. The method of claim 1 wherein the pin-inserting step includes positioning the pin at least in part by attaching a lifting device to the retainer.

* * * * *

UNITED STATES PATENT AND TRADEMARK OFFICE
CERTIFICATE OF CORRECTION

PATENT NO. : 5,377,408
DATED : January 3, 1995
INVENTOR(S) : Harvey J. Kallenberger et al.

It is certified that error appears in the above-indentified patent and that said Letters Patent is hereby corrected as shown below:

Column 6, line 63, delete "7" and insert --57--.

Column 8, line 64, delete "an" and insert --said at least one--.

Signed and Sealed this

Fourteenth Day of March, 1995

Attest:

BRUCE LEHMAN

Attesting Officer     Commissioner of Patents and Trademarks